April 7, 1936.  S. MOREIRA  2,036,880

WELDING METHOD

Filed March 6, 1934  2 Sheets-Sheet 1

Inventor:
SALVADOR MOREIRA,
by Usina & Rauber
his Attorneys.

April 7, 1936.   S. MOREIRA   2,036,880
WELDING METHOD
Filed March 6, 1934   2 Sheets-Sheet 2
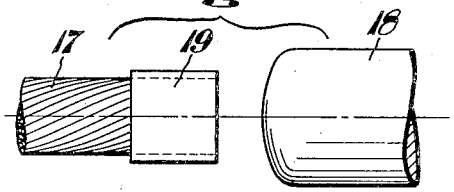
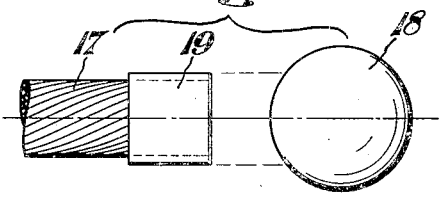
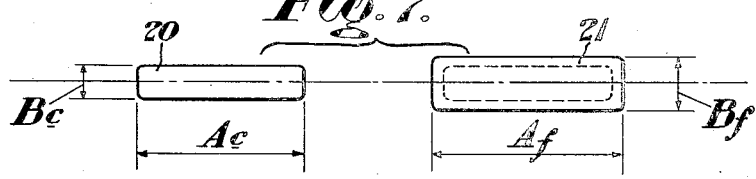
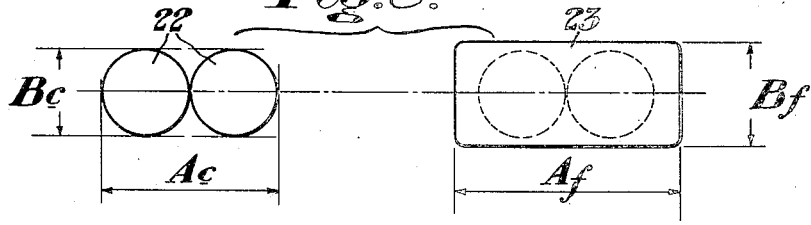
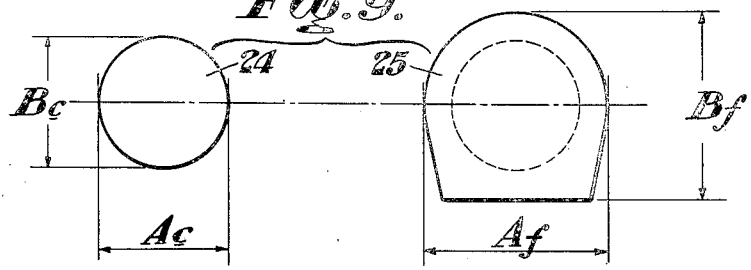
Inventor:
SALVADOR MOREIRA,
by Usina & Lauber
his Attorneys.

Patented Apr. 7, 1936

2,036,880

UNITED STATES PATENT OFFICE 2,036,880

WELDING METHOD

Salvador Moreira, Worcester, Mass., assignor to The American Steel and Wire Company of New Jersey, a corporation of New Jersey Application March 6, 1934, Serial No. 714,307

6 Claims. (Cl. 219—10)

My invention relates to the art of joining a cupreous metal part to a ferrous metal part, one of my objects being to provide a method that will be sufficiently reliable in its results to permit its use commercially in the manufacture of large numbers of articles including such parts joined together. Another object is to provide an improved article of manufacture including such parts joined together. Other objects may be inferred from the following disclosure.

The invention is of value particularly, though not solely, in the making of bonds for railway rails, of the type using steel terminals at the ends of a copper cable. The limitations of size and space within which these bonds are used, of strength to permit them to withstand strain of application of the rails and the jarring which occurs in use as well as of electrical conductivity, are particularly well met where the terminals are applied by the present process.

Referring to the accompanying drawings:

Figures 5 through 9 are detail views showing the parts to be joined as being of various shapes, so as to illustrate the adaptability of my method.

Figure 1:
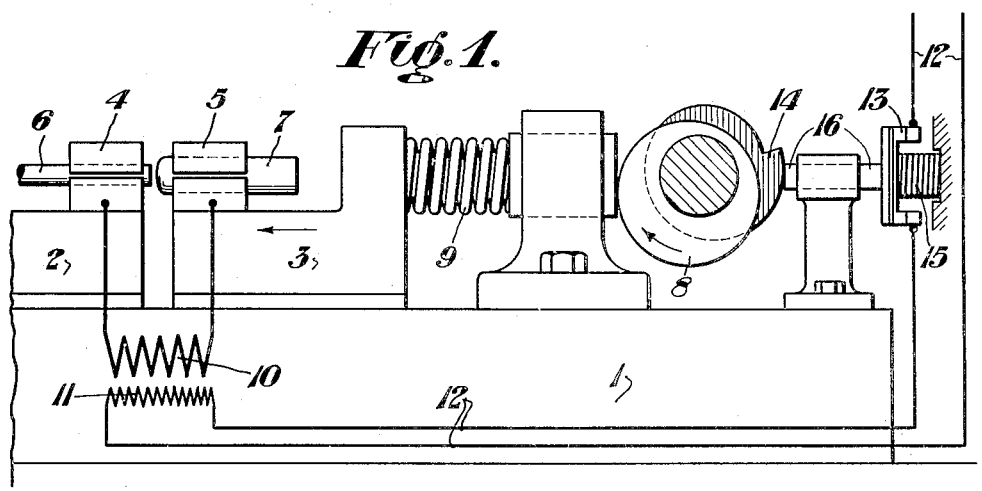
Figure 1 is a diagrammatic view of a welding machine by means of which a cupreous metal part and a ferrous metal part are being joined according to the principles of my method.

Referring more particularly to the drawings, Figure 1 shows a machine including a base 1 insulatingly carrying a fixed mount 2 and a movable mount 3. These mounts position suitable clamping dies 4 and 5. The die 4 engages a cupreous metal bar 6, and the die 5 engages a ferrous metal bar 7, these being the parts to be joined. A cam 8 thrusts through a spring 9 to move the mount 3 towards the mount 2.

A transformer is arranged with its secondary 10 connected to the dies 4 and 5 and with its primary 11 powered by lines 12 in which a switch 13 is interposed. This switch 13 is held closed by a cam 14 which turns with the cam 8, a spring 15 tending to open this switch and the cam 14 working directly against this spring by means of a push-bar 16.

According to my method, the cam 8 is rotated so as to adjacently position the parts 6 and 7, and the transformer is powered to pass an electric current through these parts to produce an arc effect. Continued rotation of the cam 8 then pushes the parts 6 and 7 together, the force being transmitted through the spring 9. In these respects it is generally similar to the electric flash-butt-welding method.

However, it is distinguished from this old method in that the spring 9 and cam 8 are respectively constructed and arranged to provide an extreme push-up pressure which moves the parts 6 and 7 together with sufficient force to produce a forged union of the two with the physical characteristics of each substantially the same as they originally were.

In the flash-butt-welding method the weld is formed from cast metal. Therefore, assuming the cupreous part 6 to be an ordinary commercial copper bar which is worked to size and therefore possesses a tensile strength of about 35,000 pounds per square inch or more, it is apparent that such a cast metal weld does not possess the greatest possible strength, since cast copper has a tensile strength of only about 24,000 pounds per square inch. My method does not have this fault, since the extreme push-up pressure works the cupreous part so it retains or regains its strength.

It is difficult to disclose a definite factor by which the conventional push-up pressure must be multiplied to produce the desired result. However, the necessary increase may be ascertained with certainty by a series of tests. For instance, assuming the usual type of flash-butt-welding machine is being used and that the cross-sectional area of the cupreous part is known, it is possible to continuously increase the push-up pressure so as to reach a point where tensioning tests indicate that it has become sufficient to provide the force which is equal to that required to provide the mechanical working necessary to remove the physical characteristics of cast metal. Such pressure increases may ordinarily be obtained by the use of a stronger push-up spring and a more powerful driving motor.

One of my own tests indicate that with a welding machine which ordinarily gave a maximum push-up pressure of 2,400 pounds, it was necessary to alter the construction so as to provide a pressure of about 11,450 pounds. This particular test was conducted in connection with the manufacture of medium weight rail bonds, the service conditions to which these articles are subjected naturally demanding that their copper strands be joined to their steel terminals in such a manner that the extremes in tensile strengths are provided.

My method is further distinguished from the flash-butt-welding method in that the current passing through the parts being joined is interrupted simultaneously with the application of the push-up pressure to these parts. The ordinary method of interrupting the current is by means of electromagnetically operated relays which are controlled by rotation of the push-up cam. So far as I am aware, no one has ever realized that the time lag inherent in such devices is sufficient to interfere with the perfect joining of the parts. That is to say, those following the convention of flash-butt-welding method, always considered it sufficient to interrupt the heating current at approximately the same time the push-up pressure was applied, whereas I have found that this must be done simultaneously.

In actual practice, I use the switch 13 which directly interrupts the power source to the welding transformer by being moved by the cam 14 which turns with the push-up cam 8, all of which has been previously described. So far as I know, this is the only practical way to interrupt the current passing through the parts, simultaneously with the application of the push-up pressure, since all commercially available relay apparatus involve some time lag.

Still another distinguishing feature of my invention consists in a certain correlation of the voltage and length of duration of the current which the transformer passes through the parts. I have found that the welding of a cupreous metal part to a ferrous metal part demands a very nice correlation of these factors, which has not been heretofore disclosed in such a manner as to enable practical welding of such parts.

I have found that when the cupreous metal part has a cross-sectional area not exceeding .1045 square inches that the current passed through the parts for heating purposes should be proportioned so that its voltage multiplied by the number of seconds it is maintained should equal a constant of 3.50 with a plus-or-minus variation of .35. This current must, of course, have at least sufficient voltage to produce the desired arc effect between the parts.

When the cupreous metal part has a cross-sectional area which exceeds .1045, the current passed through the parts should be proportioned so that its voltage multiplied by the number of seconds it is maintained equals a constant of 5.85 with a plus-or-minus variation of .65.

My method is also distinguished in that the relative size of the cupreous metal part and of the ferrous metal part are correlated in a certain manner which I have found to be a contributing factor in the perfect joining of such parts.

Accordingly, in following my method, the parts are constructed so proportioned that when they are arranged in the relationship in which they are to be joined the common logarithm of a measurement in mils of the dimension of the ferrous metal part taken at right angles across the common center line of the two equals the common logarithm of a measurement in mils of the dimension of the cupreous metal part taken across the common center line and parallel to the first mentioned measurement, multiplied by the constant factor 1.1090 with a plus-or-minus variation of .085.

I have now described individually the various distinguishing features of my method. Each of these contributes to the successful joining of a cupreous metal part to a ferrous metal part, and when they are all used together they provide a method which is sufficiently reliable to permit its use commercially on a large scale. That is to say, the chance of unsuccessful welds is so slight that it is possible to economically manufacture large numbers of articles including such parts joined together.

Figure 2:
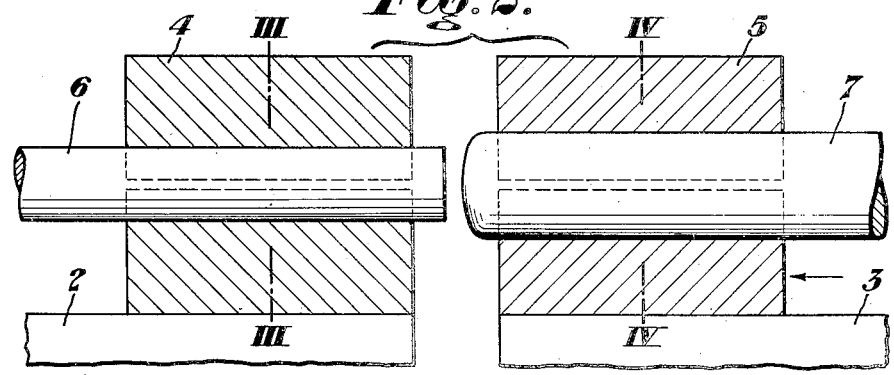
Figure 2 is an enlarged sectional view of details from the first figure.

As an example, I will now show the operation of my method in complete form. This is illustrated by Figure 2, which shows, in an enlarged scale, the dies 4 and 5 engaging the copper bar 6 and the steel bar 7.

Since the two parts, 6 and 7, are cylindrical, their required dimensions may be ascertained from their respective diameters. That is to say, assuming the parts are arranged in axial alinement, their respective axes will coincide to form the common center line of the two, and the diameter of the part 7 will be a measurement taken at right angles across this common center line, while the diameter of the part 6 will necessarily be a measurement of its dimension, also taken across this center line. Because of the cylindrical form, the second measurement need not, in this case, be parallel to the first measurement.

Since it is necessary for the dimensions of one part to proportionately follow those of the other, I must assume that only one of the parts must be held to a certain size. Therefore, I am assuming that the steel bar 7 must have a diameter of .434 of an inch or, in other words, 434 mils. To provide a successful weld, the copper bar 6 must be proportioned in the manner I have described.

Thus, reference to the common logarithm tables shows that the logarithm of 434 is 2.6374897 which, when divided by the constant 1.1090 will equal the logarithm of the number which is the diameter in mils which the copper bar 6 must have, it being understood that there may be a possible plus-or-minus variation of .085. This logarithm proves to be 2.5740313; and this is the logarithm of 375. Therefore, the diameter of the copper bar 6 must be 375 mils when the diameter of the steel bar 7 is 434 mils.

When the parts 6 and 7 have been proportioned in the above manner, it must be seen that the proper voltage is used respecting the time the current is to be maintained, it being understood that I am considering the two bars as being arranged in the machine illustrated by Figure 1. As the diameter of the copper bar 6 is such that its cross-sectional area is over .1045 square inches, the two factors in question should be proportioned so that when multiplied together they will equal the constant 5.85 with a possible plus-or-minus variation of .65. Usually, the voltage is determined by the electrical equipment of the machine, and cannot be so easily varied as can its duration. Therefore, it may often prove desirable to vary only the time so as to produce a result agreeing with the constant just stated. It is to be understood that the time must be figured in terms of seconds.

Assuming now that the foregoing variables are all proportioned as described, it is only necessary to operate the welding machine in the usual manner to produce a good union. However, if greater perfection is desired, it is also necessary that the usual relay apparatus which controls the welding current be substituted by the heavy switch 13 working directly in the power line 12 and directly controlled by the cam 14.

In the usual arrangement, the time lag will be sufficient to introduce a factor which may destroy the effects resulting from properly proportioning the welding current respecting its voltage and its time of use.

Also, if the greatest possible strength is desired, it is necessary to use much more push-up power than is ordinarily possible with the usual type of flash-butt-welding machine. Since I have already described how this may be done and the reasons involved, I do not deem it necessary to again describe this feature.

Figure 3:
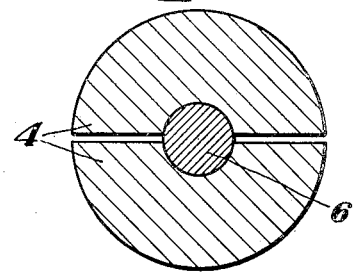
Figures 3 and 4 are cross-sections from the lines III—III and IV—IV in Figure 2.
Figure 4:
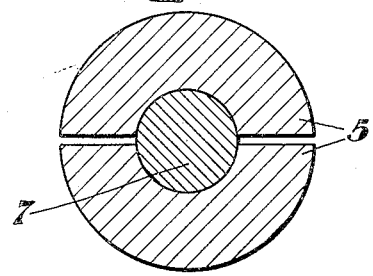

Another example of the application of my method, so far as it is concerned with proportioning the respective parts, is shown by Figure 3. Here the cupreous metal part is a cable 17 composed of a number of small copper strands, and it is desired to join this cable to a round steel bar 18. As is often done, the cable 17 is provided with a steel ferrule 19 for the purpose of holding its individual strands against displacement.

My method is sufficiently flexible to meet the above conditions. Again, since both parts are round, the diameters of these parts may be used as the measurements necessary to obtain the proper proportioning of the two. The diameter of the cupreous metal part should be taken so as to include the steel ferrule 19, I having found that the plus-or-minus variations included among the arithmetics in my methods are sufficient to cover such a situation. Since the further application of my method in this instance is the same as has already been described, it is needless to specifically redescribe the same.

However, it should be noted that the steel part 18 may be right angularly joined to the cable 17 without involving any departure from the application of my method. This follows from the fact that both parts are circular so that the measurements taken in the required directions may still be the same as the diameters of the respective parts. This also provides for one of the abutting surfaces being rounded to facilitate starting of the arc. Figures 2 and 3 show the steel or ferrous part as being slightly rounded for this purpose. Such size decrease should not extend for more than .250 of an inch from the dimensioning part.

To show that my method may be applied with equal facility to proportion the respective parts when they are not round, I have illustrated, in Figure 7, a case involving a cupreous metal part 20 and a ferrous metal part 21, both having flatly rectangular cross-sections. For illustrative purposes, the ends only of these parts are shown, no effort being made to show them in the respective positions which they should have when joined together, excepting that their then common center line is indicated. The required measurements may be taken from the part 21 in either the direction $Af$ or $Bf$, while that of the part 20 may be taken in either the direction $Ac$ or $Bc$, provided that in either instance the respective measurements of each are taken parallel to one another and at right angles to the common center line.

Figure 8 illustrates the application of my method to a case where two parallel copper bars 22 are to be joined to a single steel bar 23 of rectangular cross-section. Here again the measurements of the part 23 may be taken in either the direction $Af$ or $Bf$, while that of the copper part, constituting the two copper bars 22, may be taken in either the direction $Ac$ or $Bc$.

Figure 9 illustrates the manner of taking the measurements in the case of a round copper bar 24 which must be joined to a steel part 25 having a cross-section which is partly round and partly rectangular. Similar symbols are used to indicate the respective measurements as were used in connection with Figures 7 and 8.

I have shown these various different shapes to illustrate that my method is applicable to any, and that shape is not necessarily a factor. However, I wish it to be understood that in all cases the measurements required to obtain the proper dimension of the two parts should be in mils and should be taken at right angles across the center line of the two parts, this center line being that common to both when they are arranged in their joined relationship, and that the measurements of all of the parts must be taken parallel to one another.

The reason it is necessary for me to include the possible plus-or-minus variations in connection with the proportioning of the voltage and time relationship of the welding current and the sizes of the parts being joined, is because of the fact that various copper alloys behave somewhat differently, this applying equally well to the ferrous alloys. Also, it is necessary to consider the characteristics of different welding machines, it being well known that the mechanical and electrical characteristics and performance of one machine is seldom exactly the same as those of another.

I claim:

1. A method of joining metal parts, including constructing one of said parts of cupreous metal with a cross-sectional area not exceeding .1045 square inches, and the other of said parts of ferrous metal with a cross-sectional area substantially larger than that of the former adjacently positioning said parts, passing an electric current through said parts which is proportioned so that its voltage multiplied by the number of seconds it is maintained equals a constant of 3.50 with a plus-or-minus variation of .35, said current having at least sufficient voltage to produce an arc effect between said parts, and pushing said parts together, when said arc effect stops, with a force which is at least equal to that required to provide the mechanical working necessary to forge said parts together and remove the physical characteristics of cast metal from said cupreous metal part.

2. A method of joining metal parts, including constructing one of said parts of cupreous metal with a cross-sectional area exceeding .1045 square inches, and the other of said parts of ferrous metal with a cross-sectional area substantially larger than that of the former adjacently positioning said parts, passing an electric current through said parts which is proportioned so that its voltage multiplied by the number of seconds it is maintained equals a constant of 5.85 with a plus-or-minus variation of .65, said current having at least sufficient voltage to produce an arc effect between said parts, and pushing said parts together, when said arc effect stops, with a force which is at least equal to that required to provide the mechanical working necessary to forge said parts together and remove the physical characteristics of cast metal from the same.

3. A method of joining metal parts, including constructing one of said parts of ferrous metal and the other of cupreous metal, proportioning said parts so that when they are arranged in the relationship in which they are to be joined the common logarithm of a measurement in mils of the dimension of the ferrous metal part, taken at right angles across the common center line of the two, equals the common logarithm of a measurement in mils of the dimension of the cupreous metal part taken across said center line parallel to the first named measurement multiplied by the constant 1.1090 with a possible plus-or-minus variation of .085, then adjacently arranging said parts in said relationship, passing an electric current through said parts so as to produce an arc effect, and simultaneously interrupting said current and pushing said parts together with a force which is at least equal to that required to provide the mechanical working necessary to remove the physical characteristics of cast metal from at least said cupreous metal part.

4. A method of joining metal parts, including constructing one of said parts of cupreous metal with a cross-sectional area not exceeding .1045 square inches, and the other of said parts of ferrous metal with a cross-sectional area substantially greater than that of the former, proportioning said parts so that when they are arranged in the relationship in which they are to be joined the common logarithm of a measurement in mils of the dimension of the first named part taken at right angles across the common center line of the two equals the common logarithm of a measurement in mils of the dimension of the second named part taken across said center line parallel to the first named measurement multiplied by the constant 1.1090 with a possible plus-or-minus variation of .085, then adjacently arranging said parts in said relationship, passing an electric current through said parts which is proportioned so that its voltage multiplied by the number of seconds it is maintained equals a constant of 3.50 with a plus-or-minus variation of .35, said current having at least sufficient voltage to produce an arc effect between said parts, and pushing said parts together simultaneously with the stoppage of said current with a force which is at least equal to that required to provide the mechanical working necessary to remove the physical characteristics of cast metal from at least said cupreous metal part.

5. A method of joining metal parts, including constructing one of said parts of cupreous metal with a cross-sectional area exceeding .1045 square inches and the other of said parts of ferrous metal with a cross-sectional area substantially greater than that of the former, proportioning said parts so that when they are arranged in the relationship in which they are to be joined the common logarithm of a measurement in mils of the dimension of the first named part taken at right angles across the common center line of the two equals the common logarithm of a measurement in mils of the dimension of the second named part taken across said center line parallel to the first named measurement multiplied by the constant 1.1090 with a possible plus-or-minus variation of .085, then adjacently arranging said parts in said relationship, passing an electric current through said parts which is proportioned so that its voltage multiplied by the number of seconds it is maintained equals a constant of 5.15 with a plus-or-minus variation of .65, said current having at least sufficient voltage to produce an arc effect between said parts, and pushing said parts together with a force which is at least equal to that required to provide the mechanical working necessary to remove the physical characteristics of cast metal from at least said cupreous metal part.

6. An article of manufacture including a ferrous metal part and a cupreous metal part butt-welded together, said article being characterized in that the butt-welded portion of at least said cupreous metal part is forged sufficiently to impart the physical characteristics of worked cupreous metal to the same, and in that the sizes of said parts are so related that the common logarithm of a measurement in mils of the dimension of said ferrous metal part, taken at right angles across the common center line of the two, equals the common logarithm of a measurement in mils of the dimension of said cupreous metal part taken across said center line parallel to the first named measurement, multiplied by the constant 1.1090 with a possible plus-or-minus variation of .085.

SALVADOR MOREIRA.